(12) United States Patent
Kussmaul et al.

(10) Patent No.: US 11,498,569 B2
(45) Date of Patent: Nov. 15, 2022

(54) VEHICLE EQUIPMENT FOR NOTIFICATION OF TRAFFIC IMPACTING EVENTS

(71) Applicant: International Business Machines Corporation, Armonk, NY (US)

(72) Inventors: Timo Kussmaul, Boeblingen (DE); Uwe Hansmann, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 16/941,932

(22) Filed: Jul. 29, 2020

(65) Prior Publication Data

US 2022/0032918 A1 Feb. 3, 2022

(51) Int. Cl.
*B60W 40/00* (2006.01)
*B60W 40/04* (2006.01)
*G06F 3/12* (2006.01)
*G06N 20/00* (2019.01)
*B60W 40/06* (2012.01)

(52) U.S. Cl.
CPC ........... *B60W 40/04* (2013.01); *B60W 40/06* (2013.01); *G06F 3/1205* (2013.01); *G06F 3/126* (2013.01); *G06F 3/1284* (2013.01); *G06N 20/00* (2019.01)

(58) Field of Classification Search
CPC .............................. B60W 40/04; B60W 40/06
See application file for complete search history.

(56) References Cited

U.S. PATENT DOCUMENTS

2013/0340675 A1* 12/2013 Bakken .................. E01C 11/00
                                                                                        134/22.18
2021/0072725 A1*  3/2021 Rakshit .............. G05B 19/4099

FOREIGN PATENT DOCUMENTS

DE      102015225411 A1     6/2017
DE      102017219301 A1     5/2019

OTHER PUBLICATIONS

Dunker, Hilmar, "Security for Autonomous Vehicles", Mercedes ESF 2019, May 20, 2019, 11 pages, <https://www.car-it.com/sicherheit-fuer-autonome-fahrzeuge/id-0063294>.
Guerrero-Ibanez et al., "Sensor Technologies for Intelligent Transportation Systems", MDPI, Journal, Sensors 2018, 18, 1212; Received: Feb. 22, 2018; Accepted: Apr. 12, 2018; Published: Apr. 16, 2018, 24 pages, <doi:10.3390/s18041212>.

(Continued)

*Primary Examiner* — Benjamin O Dulaney
(74) *Attorney, Agent, or Firm* — David K. Mattheis; Maeve M. Carpenter

(57) ABSTRACT

Onboard vehicle software that performs the following operations: (i) receiving, by a control device installed with a vehicle, situation assessment information pertaining to vehicle traffic; (ii) determining, by the control device, whether the situation assessment information is indicative of an event likely to impact vehicle traffic; and (iii) in response to determining that the situation assessment information is indicative of the event likely to impact vehicle traffic, sending, by the control device, a print command to a printer communicatively coupled to the control device, the printer adapted to print a patterned layer of a coloring substance to a surface supporting the vehicle, and the print command instructing the printer to print the coloring substance to the surface in a pattern encoding a notification.

20 Claims, 3 Drawing Sheets

(56) References Cited

OTHER PUBLICATIONS

Hermann et al., "Driving Situation Analysis in Automotive Environment", Proceedings of the 2008 IEEE International Conference on Vehicular Electronics and Safety, Columbus, OH, USA, Sep. 22-24, 2008, 6 pages.

Kurec et al., "Advanced Modeling and Simulation of Vehicle Active Aerodynamic Safety", Hindawi, Journal of Advanced Transportation, vol. 2019, Article ID 7308590. 18 pages, <htttps://doi.org/10.1155/2019/7308590>.

* cited by examiner

VEHICLE EQUIPMENT FOR NOTIFICATION OF TRAFFIC IMPACTING EVENTS

BACKGROUND

The present invention relates generally to the field of vehicle equipment, and more particularly to using vehicle equipment to distribute notifications to traffic participants.

In vehicle traffic, an accident could potentially be avoided if information about a traffic impacting event was available to traffic participants before the traffic participants reach the location of the traffic impacting event.

For example, in the case of an emergency or vehicle breakdown, a vehicle driver may stop the vehicle, take out an emergency triangle, walk a certain distance (for example, 100 meters) toward incoming traffic, and place the emergency triangle at the side of the road. During that time, there is a risk that a second vehicle driver might not see the stopped car or the walking driver and cause an accident. Available communication means might be ineffective in communicating the event, for example, if a radio of the second vehicle is turned off, or if the second vehicle is not equipped to receive automatic vehicular communication.

SUMMARY

According to an aspect of the present invention, there is a method, computer program product and/or system that performs the following operations (not necessarily in the following order): (i) receiving, by a control device installed with a vehicle, situation assessment information pertaining to vehicle traffic; (ii) determining, by the control device, whether the situation assessment information is indicative of an event likely to impact vehicle traffic; and (iii) in response to determining that the situation assessment information is indicative of the event likely to impact vehicle traffic, sending, by the control device, a print command to a printer communicatively coupled to the control device, the printer adapted to print a patterned layer of a coloring substance to a surface supporting the vehicle, and the print command instructing the printer to print the coloring substance to the surface in a pattern encoding a notification.

DETAILED DESCRIPTION

Figure 1:
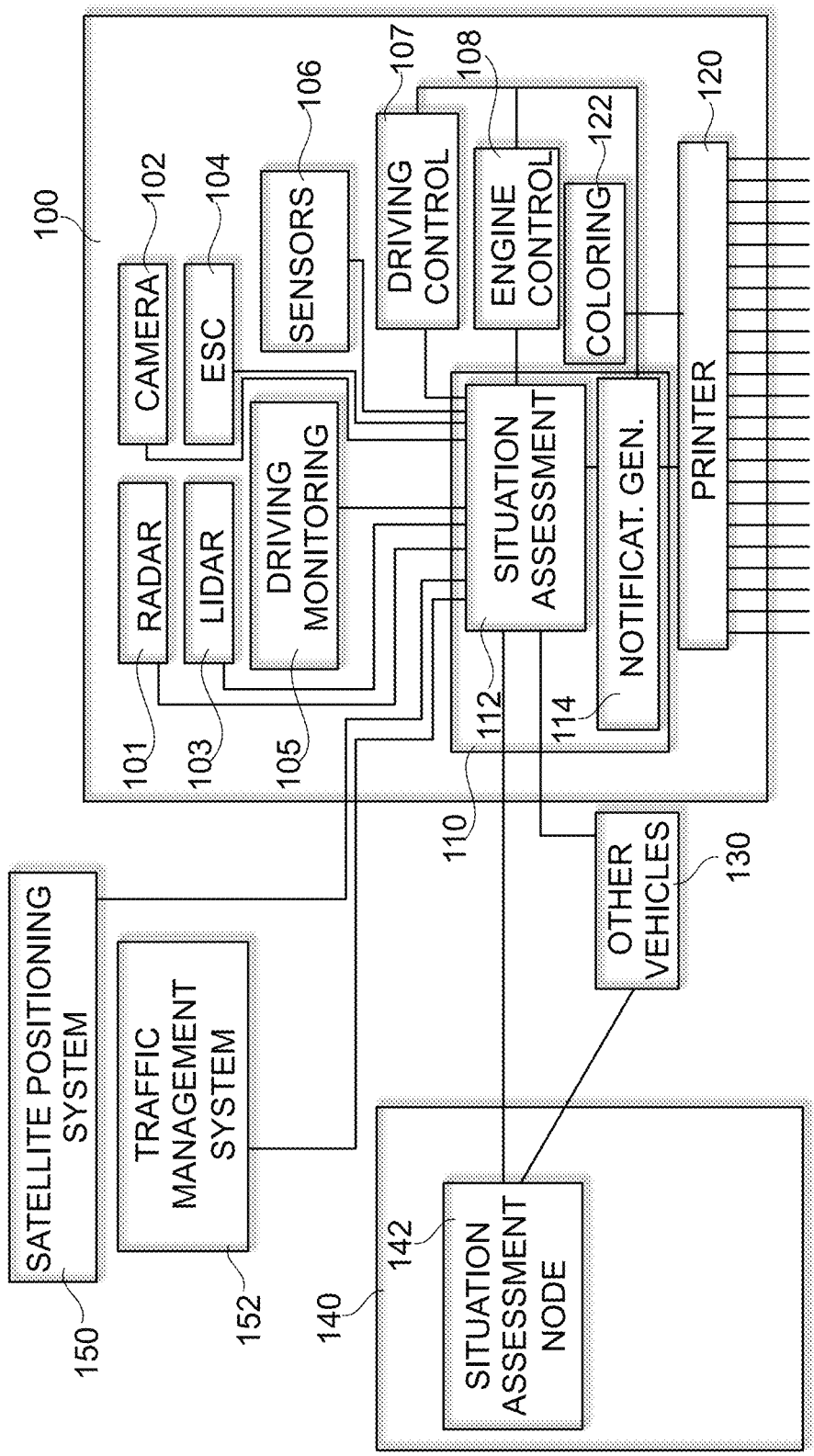
FIG. 1 is a block diagram illustrating an exemplary computing environment where a method for notifying of potentially traffic-impacting events may be implemented, according to an embodiment of the present invention.

Embodiments of the present invention recognize that vehicles on a roadway, for example, can be communicatively connected to a central server or can connect directly to each other. In both cases, the vehicles may be configured for exchanging critical emergency information quickly, such as by using vehicle-to-vehicle communication with the vehicles next to them. If, for example, an accident has just occurred in front of a vehicle and its driver must use the brakes to stop the vehicle quickly, today's vehicle-to-vehicle communication systems may distribute this critical information to other connected vehicles quickly so the vehicles may slow down and/or otherwise avoid the accident.

Embodiments of the present invention recognize that, as the market for vehicular communication continues to grow in today's luxury car market, one can expect to see a transfer of this technology to the general market during the next ten to twenty years, and to special markets and segments such as classic cars during the next thirty to fifty years, for example. Therefore, an approach for relaying critical information from connected to non-connected vehicles is desirable.

In some embodiments, systems warn vehicles of a predefined event potentially impacting vehicle traffic ("the event"). The event may be defined as an event that has already occurred, that is currently occurring, or that is expected to occur in the future. Various events may have an impact on vehicle traffic, for example: events related to a vehicle carrying a control device and a printer, or its occupants ("the vehicle"); an event related to another vehicle that may be reached by the vehicle within a predefined time interval; or an event related to an environment of the vehicle, such as a road carrying the vehicle, any vehicular and/or non-vehicular traffic participants that may be able to reach the vehicle within a predefined time, buildings and other technical installations within a predefined distance to the vehicle, subjects and items of nature or agriculture such as plants, animals, water and soil, and weather and atmospheric conditions such as precipitation, wind, air temperature, humidity, ice, moisture, sunshine, or meteor impact.

Without limitation, the vehicle may be a car, a truck, a train, a motorcycle, or, more generally, any ground vehicle that may be followed by another ground vehicle in a typical situation of usage, so that any pattern printed to the surface of the vehicle may be recognized by a vehicle driver or sensor in close proximity to the printing vehicle. The vehicle is supported by a surface, for example, a road surface, wherein a surface shall be understood as supporting the vehicle if it carries the wheels of the vehicle.

The control device may become aware of the event, for example, by comparing incoming situation assessment information to predefined criteria or by applying a classification technology. For that purpose, the control device may be communicatively coupled to a sensor, a communication interface to a node that may be internal to the vehicle (for example a vehicle bus, a mobile computing device of an occupant of the vehicle) or external (for example an Internet connection, a vehicular communication system, a radio receiver), or directly to a processor or a further device on board of the vehicle. In general, sources of the situation assessment information may be any source of data suitable for indicating, or allowing to conclude on, the presence of a predefined event potentially impacting vehicle traffic.

The control device may be configured for receiving situation assessment information that is explicitly descriptive of the event (for example a dataset received from an external server and describing an accident or an obstacle that may be reached by the vehicle within a predefined time) or situation assessment information that needs to be analyzed by the control device to determine whether the situation assessment information is indicative of the event or not. For that purpose, the control device may implement a logic comprising predefined criteria relating to content of the situation assessment information that is characteristic of the event(s) which shall be recognized. Such logic may comprise a situation assessment model that may be fully computer-generated (for example, a trained machine-learning model) or may be partially or completely programmed manually.

Hybrid on- and offline approaches may likewise be realized where, for example, a communications controller continuously sends sensor data and/or preprocessed data obtained on board of the vehicle to an external node (for example, a dedicated server or a computing cloud) where the vehicle's data is analyzed and, if the vehicle's data matches a predefined definition or category of an event potentially impacting vehicle traffic, a descriptive dataset of the event is generated and sent back to the vehicle where the control device may, for example, be listening on the vehicle bus to receive the descriptive dataset.

Without limitation, the situation assessment information may contain a current time or time of day, a current date, a current weather condition, a characterization of the surface supporting the vehicle (for example, a photograph of the surface), a type of traffic way currently used by the vehicle (for example, an identifier of the road type currently travelled by the vehicle according to a suggested or determined route of the vehicle, optionally taking into account a present direction and velocity of the vehicle), a measured or predicted environmental light intensity (for example according to an ambient light sensor or a daytime model of the vehicle's location), and measured data from any sensor on board of the vehicle, including but not limited to a level of fuel, a hydraulic fluid level of the braking system or the power steering system, a battery charge or voltage, a tire pressure, etc.

The situation assessment information may further contain a binary indicator indicating whether the event potentially impacting vehicle traffic has occurred (or is likely to have occurred with a sufficient certainty). Alternatively or additionally, the situation assessment information may contain a numerical measure of probability that the event is occurring or will occur. The control device may be adapted to trigger the printing if such obtained probability exceeds a predefined threshold value. Such threshold value may be equal for all predefined events to be warned of, or it may be specific to each such event; it may be specific to predefined information sources, and may, in particular, implement a numerical measure of trustworthiness or reliability for each registered source of information, and probably also for any unknown source, which may be ranked with a standard threshold value such as 50%. If the probability is normalized within an interval between and including zero and one, a total probability threshold may be obtained by multiplying all applicable partial thresholds. For example, a total threshold of 63% may be obtained from multiplying a reliability threshold of 90% for the source of the situation assessment information being the internet with a probability threshold of 70% for the event that a trail of a traffic jam lies within a distance of 1 kilometer.

The hardware of the control device may be implemented in various manners. Without limitation, the control device is treated herein as a preconfigured digital device comprising a processor and memory. For instance, the control device may be a dedicated piece of hardware or may be hardware or software integrated in a vehicle control system; it may as well be a separate unit integrated with a housing of the printer or may be integrated as software in a controller of the printer.

The vehicle comprises a printing device ("the printer") that is able to print signs onto the surface. The printer is in communicative connection to the control device, for example directly or via an internal communications interface such as a vehicle bus. The printer can be controlled by the control device using a predefined set of print commands. The printer may comprise a reservoir for each coloring substance to be patterned onto the surface; a means (for example, a valve, a piston, a screw) for dosing a quantity of the coloring substance that is required in order to print the pattern according to any presently received print command; and a means (for example, a channel system with controllable flaps, a motor-driven print head) for spatially distributing the dosed quantity of coloring substance to form the pattern to be printed to the surface.

The control device may be configured to control the printer for printing coloring substances to patterns that may be determined by the obtained situation assessment information, but alternatively or additionally, the control device may be configured to send a printing command to the printer that the printer interprets as a binary command for printing a predetermined pattern that is independent of the particular command given. In an example, the painting device contains a set of fluid color tanks with at least one valve each, wherein a controller of the printer opens and closes the valves depending on the received control signals and each valve is positioned such that the fluid is applied to the surface when the valve is open.

In another example, the printer is installed in a sealable compartment in the bottom part of the vehicle's body, wherein the seal of the compartment can be opened and closed by a suitable predefined command issued by the control device, and the printer comprises a lowerable coloring substance application unit adapted for bridging the gap between the vehicle body and the surface to be printed on, wherein the application unit comprises a parallel arrangement of channels through which the coloring substance(s) may be ejected onto the surface as controlled by the control device and a drive for lowering and lifting the application unit may be controlled by a suitable predefined command issued by the control device.

The printer may be adapted for printing a single coloring substance from a single reservoir onto the surface; for printing a single or multiple coloring substances from multiple reservoirs onto the surface; for mixing different coloring substances to print the mixture onto the surface; for printing different coloring substances sequentially or synchronously to the surface such that the different coloring substances may overlay and/or mix on the surface after the printing; and/or for mixing any coloring substance to be printed onto the surface with one or more additives that may, without limitation, influence a hue, a lightness, a brightness, a colorfulness, a reflectivity, a rheological property, an adhesion to the surface, a desaturation rate, a decomposition rate in a controlled manner. For example, the reflectivity of a printed pattern may be influenced using additives such as a white pigment (for example, titanium dioxide, $TiO_2$) or rounded glass granules with sub-millimeter diameters.

A wide range of coloring substances may be selected for printing patterns on the surface. Preferably, the coloring substance(s) are partially or completely composed of "organic" substances, i.e. non-toxic, water-soluble liquid or viscous substances that are environmentally friendly, or non-toxic, environmentally friendly powders or granulates that may be received by nature as chemically inert sands. A non-exhaustive list of exemplary coloring substances includes liquids and foams (that may be stored in and dosed from a pressurized container, or alternatively, using a pressureless solution where the liquid may be expelled using a piston or a foam precursor may be foamed up by chemical activation), powders (for example, chalk or sand colored with one or more pigments), granulates, and emulsions.

If an event potentially impacting vehicle traffic is detected, the control device causes the printer to print a warning (or "notification") pattern that may be a standard warning (i.e., independent of the kind of event detected) or that may be controlled individually by the control device, for example depending on the kind of event detected. For that purpose, the control device may create one or more suitable print commands and send them to the printer. The selection of a suitable warning pattern may be based, for example, on a table assigning each kind of event to a warning pattern that may be stored for example as an image dataset or a set of predefined instructions in the control device's memory. Alternatively or additionally, the pattern to be printed may be part of the obtained situation assessment information, for example received from a server with situation assessment functionalities via the internet.

The selection of a pattern to be printed and/or the composition of the coloring substance may further depend, without limitation, on the vehicle's current, past or predicted location and/or route, the time of day, current weather conditions and/or an ambient light intensity. For instance, a pattern with bright colors may be selected in a dark environment to improve visibility of the pattern; a pattern with darker colors may be selected in bright sunshine to reduce the risk of blinding other traffic participants; or the coloring substance may be composed with a high adhesion, for example if it is raining.

The pattern to be printed may encode one or more warnings (or "notifications"). In an example, the event is freezing rain, and the control device determines that for this case the pattern should encode a "black ice" road sign, followed by a "speed limit 10 km/h" road sign.

In regular operation, it is assumed that the vehicle is moving in its forward direction and, accordingly, the pattern is printed in bottom-to-top orientation (i.e. the bottom of the warning is printed first and the top is printed last). However, the control device may be configured to determine whether the vehicle's current direction is a forward direction (for example its velocity is larger than zero) or a backward direction (negative velocity), and accordingly, to print the pattern in top-to-bottom orientation (i.e. the top of the warning is printed first and the bottom is printed last) if the vehicle is travelling backward. The control device may also be configured to sense a reversal, i.e., a change of direction from backward to forward or from forward to backward. In this case, the control device may, for example, stop the ongoing print job when sensing the reversal and restart the printing at a predefined distance from the incomplete warning pattern.

Alternatively, it may be possible to suppress the printing if the vehicle is moving backward as it may occur, for example when parking the vehicle, that the vehicle will stop for a longer time just above the printed warning. In general, it may be advantageous to suppress the printing process whenever a parking activity of the vehicle is registered.

It may also be advantageous if the situation assessment information is configured to include a time information indicating a point in time when (or a duration after which) the situation assessment information loses its validity. Similarly, the control device may assign a validity time or duration to the print job. In these cases, the control device may be configured to suppress the printing and discard the print job if the situation assessment information or the print job are out of their respective validity period. This may particularly, but not necessarily, apply if the vehicle is at standstill when obtaining the situation assessment information and starts travelling again after the validity period has ended, as it may be the case, for example, when the vehicle is parking or inside a severe traffic jam.

The vehicle may use a built-in road-surface printer to print warning patterns on the road surface, for example, at a distance of a few hundred meters in front of an accident or breakdown of the vehicle or another vehicle travelling in front of the vehicle. Hence, embodiments may have the advantage of providing a warning to other traffic participants that may follow the vehicle. The information about the event potentially impacting vehicle traffic may be exclusively available to the vehicle because its communications and computing capabilities may be enhanced in comparison to other vehicles. In this way, potentially life-saving information may be distributed at an early point in time to any vehicles and their drivers following the vehicle. For vehicles that are not equipped with vehicular communication systems such as car-to-car or car-to-x, the printed pattern may form the only available channel through which a warning of a potentially harmful event can be received. Furthermore, if the vehicle carrying the control device and the printer is associated with the event, embodiments may ensure that the broken-down car may stop safely on the side of the road without further incident.

Advantages of a connected vehicle's capability of printing a warning pattern the ground may become most effective during the next decades: Today, more and more vehicles (for example, cars) are communicatively connected to a central server or can connect between each other. In both cases, the vehicles may be configured for exchanging critical emergency information quickly, in the best case directly using car-to-car communication with the cars next to them. If, for example, an accident is just happening in front of a car and its driver must use the brakes to stop the car quickly, today's car-to-car communication may distribute this critical information to other connected cars early so they or their drivers may slow down as well to keep them from being involved in the accident.

As the market for vehicular communication has just started to grow in today's higher-end car market, one can expect to see a transfer of this technology to the general market during the next 10-20 years, and to special markets and segments such as classic cars during the next 30-50 years. Therefore, an approach for relaying critical information from connected to non-connected vehicles may form a desirable alternative until communicative connectivity becomes widespread enough to reach nearly all traffic participants with a single warning that may be broadcast or spread from vehicle to vehicle.

According to an embodiment, the pattern is independent of the situation assessment information. In this case, the control device may be adapted for generating and transmitting the print command as a binary signal to the printer that causes the printer to print a standard pattern in response to the presence of the binary signal. Alternatively or additionally, the printer may be insensitive to the particular print command passed to the printer, i.e., the printer may be configured for a binary interpretation of any incoming print command. In both cases, the control device and/or the printer may not have to spend further computing capacity on decoding, encoding an unknown pattern and/or customizing the pattern to be printed. Regarding the pattern, this may enable an earlier placement of the warning on the surface.

According to an embodiment, the pattern depends on the situation assessment information. This may allow creating a warning pattern that is more specific to the detected event. A vehicle driver noticing the printed warning pattern may then react more adequately on the expectation of the specific event. A specific design of the pattern dependent on the situation assessment information may be achieved, without limitation, by a selection of the pattern from a repository of predefined patterns, a determination of the composition of the coloring substance, and/or a provision of additional information related to the event such as an expected time and/or location of occurrence, each according to or associated with the recognized event and/or any further conditions such as a weather report or forecast or information on the structure of the surface captured by a sensor.

According to an embodiment, the method further comprises, in case the situation assessment information is indicative of the event, prior to causing the printing: (i) selecting the pattern based on the situation assessment information; and/or (ii) in case the situation assessment information further comprises a display information to be displayed to a person and associated with the event, incorporating the display information into the warning.

A situation- or event-specific pattern may allow vehicle drivers following the printing vehicle to react more adequately to the event that is warned about and may comprise, for example, a symbol such as a warning symbol, a traffic sign and/or a descriptive text associated with the event or any other information comprised by the situation assessment information and related to the event. The specific pattern may reflect a category of the event, i.e. repeated events of the same category (for example, a traffic jam) may result in a similar or identical pattern (for example, a "traffic jam" road sign). However, the display information may allow a specific configuration of the printed pattern for a single, particular event, and may enable a more precise control of distributed warnings from a central instance such as a traffic warning server or a hazard control center. For instance, the display information may include a bypass suggestion and/or information, modifiers and/or conditions specific to the single event such as its particular location. In a non-exclusive example, the display information comprises a message text such as "CRASH HWY 63 SOUTH", "FOG IN 40 SECS", "WRONG WAY DRIVER AHEAD", etc.

According to an embodiment, the method further comprises determining a criticality metric based on the situation assessment information, wherein the warning is printed only if the criticality metric exceeds a predefined criticality threshold. This may allow to filter out all events of comparably minor importance and print a warning only for the most important events, which may yield the advantage of reducing the number of printed warnings per vehicle, such that the coloring substance may be used more economically, but possibly also of reducing the total number of warnings surrounding the location of the event, which may prevent a desensitization of vehicle drivers' awareness due to an excessive presence of printed warnings on the roads.

For instance, the criticality metric may be a number (for example, a percentage or a score with no theoretical upper limit) or a qualitative rank such as a criticality level (for example "low", "medium", "high"). Without limitation, the criticality metric may be obtained using an arithmetic calculation, a categorization algorithm, or a classification model, which may include a trained machine-learning model.

According to an embodiment, the control device determines the criticality metric by providing the situation assessment information to an input of a trained machine-learning model and receiving, in response to the providing, the criticality metric from an output of the trained machine-learning model. This may enable a more comprehensive, reliable and reproducible assessment of the event's criticality and may yield a result of the assessment in a shorter time, i.e., with a more efficient consumption of computing resources for the assessment. The machine-learning model may be trained from a set of, for example, manually assessed ground-truth data by executing the machine learning mechanism particularly selected for the criticality assessment.

According to an embodiment, the method further comprises obtaining a road information characterizing a road currently used by the vehicle, wherein one or more of a dimension of the pattern and a composition of the coloring substance is determined based on the road information; and/or wherein the pattern is printed only if a road type comprised by the situation assessment information and associated with the event matches the road information.

This may allow for dimensioning the printed pattern such that it fits the present road conditions encountered by the vehicle, but that it is large enough to be clearly perceived by further vehicles and/or their drivers. In an example, the width of the pattern is predefined to be 90% of the width of the current traffic lane. Furthermore, taking into account a road type (for example, a city street, a highway, a dirt road, a country road, a bridge, a tunnel) associated with the event may allow for filtering out events that may be unrelated to the present traffic situation of the vehicle. In an example, the vehicle is travelling on a highway, but the event is an accident that has just occurred on a city street nearby, which may be interpreted as a road type mismatch by the control device such that no pattern may be printed for warning of the accident. If the vehicle leaves the highway and approaches the city where the accident happened, the road type may be reassessed and the warning printed, for example, at a threshold distance of 500 meters from the location of the accident.

Items of the situation assessment information characterizing a road currently used by the vehicle (the road information) may be, without limitation, a type of traffic way (which may be obtained, for instance, from a current position and/or route of the vehicle that may be present in a navigation system of the vehicle, or derived from the present velocity of the vehicle or from sensor data such as a recognized category of traffic signs), a type, color, or structure of the surface supporting the vehicle (which may be obtained using sensor information, for example), a dimension (for example, a width) of the road and/or the traffic lane used by the vehicle.

According to an embodiment, the method further comprises obtaining an event location associated with the event, the situation assessment information identifying a suggested route to be followed by the vehicle, the pattern being printed only if the route approaches the event location within a predefined maximum event distance. This may avoid printing the pattern too early or if the vehicle may be unlikely to approach the event location in the near future. This may yield the advantage of reducing the number of printed warnings per vehicle, such that the coloring substance may be used more economically, but possibly also of reducing the total number of warnings surrounding the location of the event, which may prevent a desensitization of vehicle drivers' awareness due to an excessive presence of printed warnings on the roads. In addition, printing the pattern not too early may increase the significance of the encoded warning as an approach of the event's location may be imminent when a following vehicle encounters the printed warning.

In an example, the printing is suppressed if the event lies within a certain minimum distance such as less than 500 meters, or is likely to be reached at the present velocity in less than a certain time difference such as 10 seconds, so it may be assumed in each or both cases that the event is sufficiently likely to be noticed by drivers of subsequent vehicles. A suggested route is understood herein as a set of predicted future locations of the vehicle, and optionally, arrival times of the vehicle assigned to some or all of these future locations. Using a suggested route may have the advantage that it may be unnecessary to execute a route exploration algorithm to assess whether the event is within reach (i.e., following traffic routes instead of just calculating the air-line distance between the vehicle's current location and the event location). It may be worthwhile to implement an additional check whether the event can be reached at all, which may be the case if the event is located, for example, within a building that cannot be accessed by the vehicle.

According to an embodiment, the method further comprises, in case the event is an imminent breakdown of the vehicle or an emergency of an occupant of the vehicle, determining a remaining distance the vehicle is expected to cover before stopping due to the event, wherein the printing of the warning is delayed until the remaining distance is less than or equal to a predetermined maximum remaining distance. A breakdown of the vehicle or an emergency situation of an occupant may be detected by sensors and/or sensor-based detection systems that may monitor, without limitation, a tire pressure, a liquid fill level (for example, fuel, hydraulic working liquid), sleepiness, gestures, heart rate and/or breathing rate of an occupant. This may prevent other vehicles following the vehicle from crashing into the vehicle or an occupant coming out of the vehicle to put up a warning triangle. The printing delay may allow for placing the printed pattern at a position that may be close to the prescribed distance for setting up the warning triangle.

According to an embodiment, the dimension of the pattern is determined based on a current velocity of the vehicle; and/or the pattern is printed only if one or more of the following criteria are fulfilled: the current velocity exceeds a predefined minimum velocity; the event is expected to occur within a predefined maximum spatial distance from a current location of the vehicle; and the event is expected to occur within a predefined maximum temporal distance from a current system time of the vehicle. Printing the pattern with dimensions depending on the vehicle's velocity may prevent a distortion of the pattern in the travelling direction of the vehicle. Printing the pattern only if a minimum velocity is exceeded may exempt cases where the vehicle is travelling slowly, for example, in a traffic jam or during parking, where it may be possible that the pattern is printed with too small dimensions, the pattern is overlooked due to high traffic density, or the pattern becomes blurry because the coloring substance cannot be dosed accurately in very small portions.

The control device may also delay the printing until temporal and/or spatial criteria are fulfilled. This may have the advantage that vehicle drivers following the printing vehicle may establish a clear relation between the warning and the event if the warning is placed not too far from the event. On the other hand, following vehicle drivers need enough time for reacting on the warning, which may become difficult if the warning is placed too closely to the event's location. In an example, the control device may be configured to print the warning only if the event's location may be reached within 30 seconds and/or lies within 1 kilometer of the vehicle's present position. The distance and/or timing for starting the printing may depend on the vehicle's current velocity, for example, the distance may be 250 meters if the speed is 50 kilometers per hour (km/h) or 1 kilometer if the speed is 100 km/h. Such printing distance may be determined using a table or a formula.

According to an embodiment, a color saturation and/or a reflectivity of the coloring substance are configured to fade at a respectively preset desaturation rate under predefined environmental conditions. This may yield a pattern that slowly fades after the printing, so that the warning may not be visible permanently. This may take into account that the event and/or its impact on the vehicle traffic may be limited in time, so a permanent warning would become a false information after some time.

The term "desaturation rate under predefined environmental conditions" may account for differences between laboratory conditions for which the desaturation rate(s) were determined and the real conditions encountered when actually printing the pattern on the surface. The predefined environmental conditions may include, without limitation, a laboratory air temperature, a test surface temperature, an amount of contamination of the test surface, and an intensity and spectral composition of laboratory lighting, each used when determining a reproducible desaturation rate of the color saturation and/or reflectivity of the coloring substance. Hence, a coloring substance that was tested to exhibit a certain desaturation behavior under the predefined conditions may desaturate, for example, faster or slower under the real conditions.

According to an embodiment, the printer is adapted for producing the coloring substance by mixing multiple coloring substance components, the mixture being determined to provide the coloring substance with desired color characteristic(s) comprising one or more of a hue of the color substance, a color saturation, a reflectivity, a desaturation rate of the color saturation, and a desaturation rate of the reflectivity, the method further comprising determining the desired color characteristic(s) based on one or more of a current weather condition, a condition of the surface supporting the vehicle, a road type currently used by the vehicle, a current time of day, and a current environmental light intensity. In this way, the hue of the color substance, the color saturation, the reflectivity, and/or the desaturation behavior of the coloring substance regarding color saturation and/or reflectivity may be set, in a controlled manner, to respective values that are suitable for the type (for example, asphalt, concrete, dirt, cobblestones) and conditions (clean, dirty, wet, dark, light) of the surface to be printed upon, as well as any ambient conditions (sunlight, rain, frost, hotness) at the time of printing. In this way, the visibility, adhesion to the ground, and desaturation behavior of the pattern may be optimized.

The initial color saturation and/or reflectivity refers to the respective value the coloring substance is predicted to have at the moment of printing the pattern, irrespective of a possible desaturation rate that may have been preset for the coloring substance. The desaturation rates are controlled according to the predefined environmental conditions mentioned above, i.e., the actual desaturation behavior of the reflectivity and/or the color saturation may differ from the expected behavior that was used for determining the composition of the mixture.

According to an embodiment, the method further comprises broadcasting a placement message to further traffic participants, the placement message indicating a location where the warning was printed, the placement message optionally further indicating a time when the warning was printed. This may prevent other traffic participants who are equipped with a road-surface printer from printing a warning pattern on top of, or closely nearby, the first warning pattern. Including the time of printing may allow for suppressing further nearby printouts for the same event during a time interval when the printed pattern is expected to be still visible or, if applicable, to have not yet fully desaturated.

According to an embodiment, the method further comprises, in case the situation assessment information comprises a signature of an information source of the situation assessment information, and validating the signature, the pattern being printed only if the signature is valid. This may prevent an unauthorized use of the printing functionality and may enable a more economic expense of the coloring substance.

According to an embodiment, the event relates to one or more of an accident, a breakdown, a public event, an expected or unexpected weather condition, an environmental condition, a traffic condition, a condition of the vehicle, and a condition of an occupant of the vehicle. Each of these event categories may produce an event that may be worth warning to prevent damage and/or injury for the vehicle, any vehicles following the vehicle, and/or the respective occupants of the vehicle or the vehicles following the vehicle. An accident may be understood as having already happened or expected to happen in the future and does not necessarily need to involve the given vehicle. Likewise, a breakdown may refer to a given vehicle or another vehicle. Examples of a public event include, without limitation, a time interval and/or a location of a sporting event, a music concert, or a parade. An expected weather condition may refer, without limitation, to fog, hailstorm, extreme rainfall, sunshine reflecting on a wet street, or freezing rain. An environmental condition may refer, without limitation, to a wildfire, a landslide, or a hurricane. Examples of a traffic condition include, without limitation, a traffic jam, road damage, a power outage of traffic lights, or animals crossing a road. A condition of the vehicle may refer, without limitation, to any system health related information of the given vehicle such as a fill level of a fuel tank, a tire pressure, or the functioning of a movable part such as a pulley. A condition of an occupant of the vehicle may include, without limitation, an output of a system for monitoring an occupant for medical emergency, or of a sleepiness warning device.

According to an embodiment, the situation assessment information is obtained from one or more of a sensor and/or a processor on board the vehicle; an internal communication device of the vehicle; the vehicular communication system; and a public communications infrastructure. This may enable the receipt of the situation assessment information from a large group of information sources. The information sources may include, without limitation, a GPS unit, an electronic stability control (ESC) unit, a camera, a computer-vision unit, a radar unit, a lidar unit, an ultrasonic unit, a driver's assistant, an autonomous driving system, a driver monitoring system that may include, for example, a camera for gesture control or a sleepiness warning device, an in-vehicle communication device (for example, a vehicle bus such as a CAN bus), a vehicular communication unit such as car-to-x or car-to-car, and/or an interface for receiving broadcast signals or messages via a public communications infrastructure, such as an internet uplink or a radio receiver.

According to an embodiment, the situation assessment information comprises one or more of an identifier, a probability, a location and/or a time associated with the event, a hazard warning, a suggested route to be followed by the vehicle, traffic density data, a weather forecast, data measured by a sensor on board of the vehicle, a vehicle status dataset, and a list of locations potentially affected by the event. The situation assessment information may form a highly diversified portfolio of information and may thus enable establishing comprehensive definitions of a large number of events in different categories, of which each may impact vehicle traffic in a specific and independent manner. In particular, the situation assessment information may comprise public information such as hazard warnings or navigation warnings, which may include, without limitation, a hazard identifier associated with the event, location coordinates, street names, traffic density data, and/or a list of locations (for example, traffic lanes, settlement names) potentially affected by the event. Non-public information may include, without limitation, a suggested route to be followed by the vehicle in particular, and/or a vehicle status dataset that may be a result of analyzing data measured by a sensor on board of the vehicle.

The case that the situation assessment information comprises information descriptive of the event may imply that the event can be detected, predicted, and/or determined outside the vehicle. In an example, the sensor data available in the vehicle is stored in a search engine hosted on a server and a continuous search query against this collection of data (from all vehicles configured to handle data in this way) is used to predict any sensor data trending towards an emergency, such as a vehicle breakdown. In this example, the query used to run against the search corpus is continuously tuned based on data received from vehicle manufacturers as well as community data from multiple owners of a particular vehicle model or vehicles of the same make. In addition, machine learning may be deployed to train a query-shaping algorithm adapted for optimizing the query.

Continuing this example, the top search result may then be used to determine an emergency situation such as a car breakdown. Based on sensor data, map data, data received from other vehicles via vehicular communication (such as hazard warnings spread in near real-time via car-to-car links) and data received from the internet of things (IOT) via car-to-x communication. In this exemplary scenario, the received or derived warning may be made available for other non-car-to-x-enabled vehicles by printing a corresponding pattern on the ground. Using the mentioned search query result, the affected vehicle may determine an expected distance until it breaks down and stops on the side of the road. This distance may be calculated based on the type of the road and speed of the surrounding vehicles, and may be used to determine an optimal location for printing the warning on the ground.

Now turning to FIG. 1, a block diagram illustrating an exemplary data processing environment is shown where the method for notifying (or "warning") of a predefined event potentially impacting vehicle traffic may be implemented. A vehicle 100 is equipped with a control device 110 and a printer 120. The control device 110 is communicatively coupled to the printer 120 so that the control device 110 may pass print commands to the printer 120. In response to receiving a print command from the control device 110, the printer 120 is adapted for printing to a surface supporting the vehicle 100 a coloring substance 122 that is stored in a container onboard the vehicle 100.

The control device 110 comprises a situation assessment component 112 and a notification generation component 114. The situation assessment component 112 comprises a communications interface for receiving situation assessment information from multiple data sources. In the non-limiting example of FIG. 1, the data sources onboard the vehicle 100 comprise a radar unit 101, a camera 102, a lidar unit 103, an electronic stability control (ESC) unit 104, a driving monitoring system 105, one or more sensors 106 such as a weather condition sensor or an ambient light sensor, an autonomous driving control unit 107, and an engine control unit 108; and the data sources outside the vehicle 100 comprise other vehicles 130 within communicative reach of the vehicle 100, a situation assessment node 142 located in a computing cloud 140, a public satellite positioning system 150 such as GPS, and a public traffic management system 152. The situation assessment component 112 is further adapted for submitting some of the situation assessment information thus received to the situation assessment node 112 for requesting additional computing performance for external situation assessment from there.

Listening on the situation assessment information, the situation assessment component 112, which may perform for example arithmetic calculations and/or implement a categorization algorithm or a classification model, including, but not limited to, a trained machine-learning model, activates the notification generation component 114 if it receives with the situation assessment information a message descriptive of an event potentially impacting vehicle traffic, and/or if it derives from the situation assessment information a feature that fulfills a predefined criterion characteristic of such an event.

In the non-limiting example of FIG. 1, the notification generation component 114 then determines from a memory of the control device 110 a warning to be printed out when the recognized event occurs. The notification generation component 114 has access to the obtained situation assessment information and translates the identified warning, for example comprising a symbol and/or a text, into print commands that are executable by the printer 120. The notification generation component 114 may implement additional criteria, such as delaying the printing if the event is still too far away, determining an optimal composition of the coloring substance according to current environmental conditions, correcting a possible distortion of the pattern to be printed according to the current velocity of the vehicle 100, and/or adding additional relevant information to be printed out as part of an enhanced warning. If all criteria for printing are fulfilled, the notification generation component 114 sends all print commands representing the warning or the enhanced warning to the printer 120. In response, the printer 120 prints out a pattern encoding the warning or the enhanced warning using the coloring substance 122.

Figure 2:
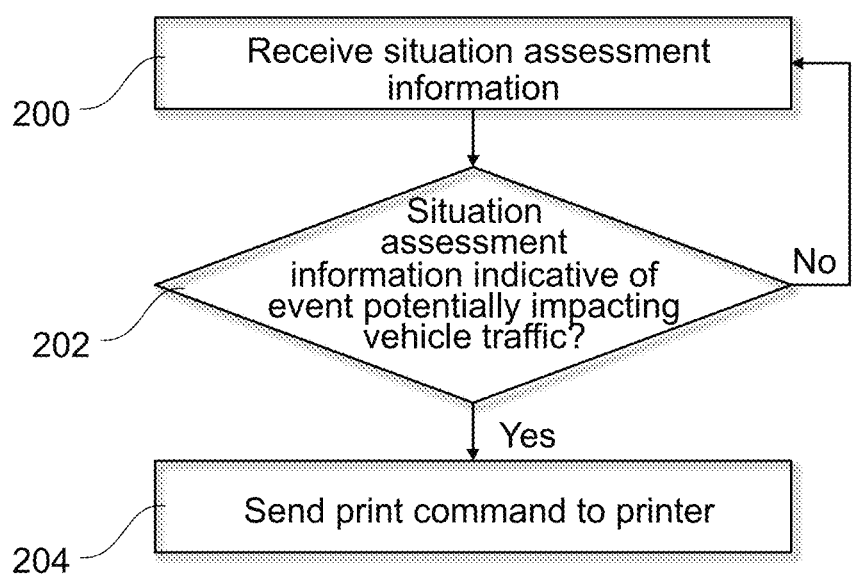
FIG. 2 is a flowchart illustrating operations of the method for notifying of potentially traffic-impacting events, according to an embodiment of the present invention.

FIG. 2 shows a flow diagram illustrating the computer-implemented method for notifying of a predefined event potentially impacting vehicle traffic. The method, performed by the control device 110, starts by receiving 200 situation assessment information, which may include receiving situation assessment information as it comes from one or more data sources, as well as deriving additional situation assessment information from any situation assessment information thus received. The control device 110 checks 202 whether the situation assessment information thus obtained is indicative of a predefined event potentially impacting vehicle traffic, and if so, sends 204 a print command to the printer 120 to cause the printer 120 to print the coloring substance 122 to a surface supporting the vehicle 100 in a pattern encoding a notification. If the situation assessment information contains no hint about any predefined event potentially impacting vehicle traffic, the control device 110 continues listening on the situation assessment information. Preferably, the control device 110 is adapted to continue listening to the situation assessment information also while preparing a print job, during execution of the print job, and after completion of the print job.

Figure 3:
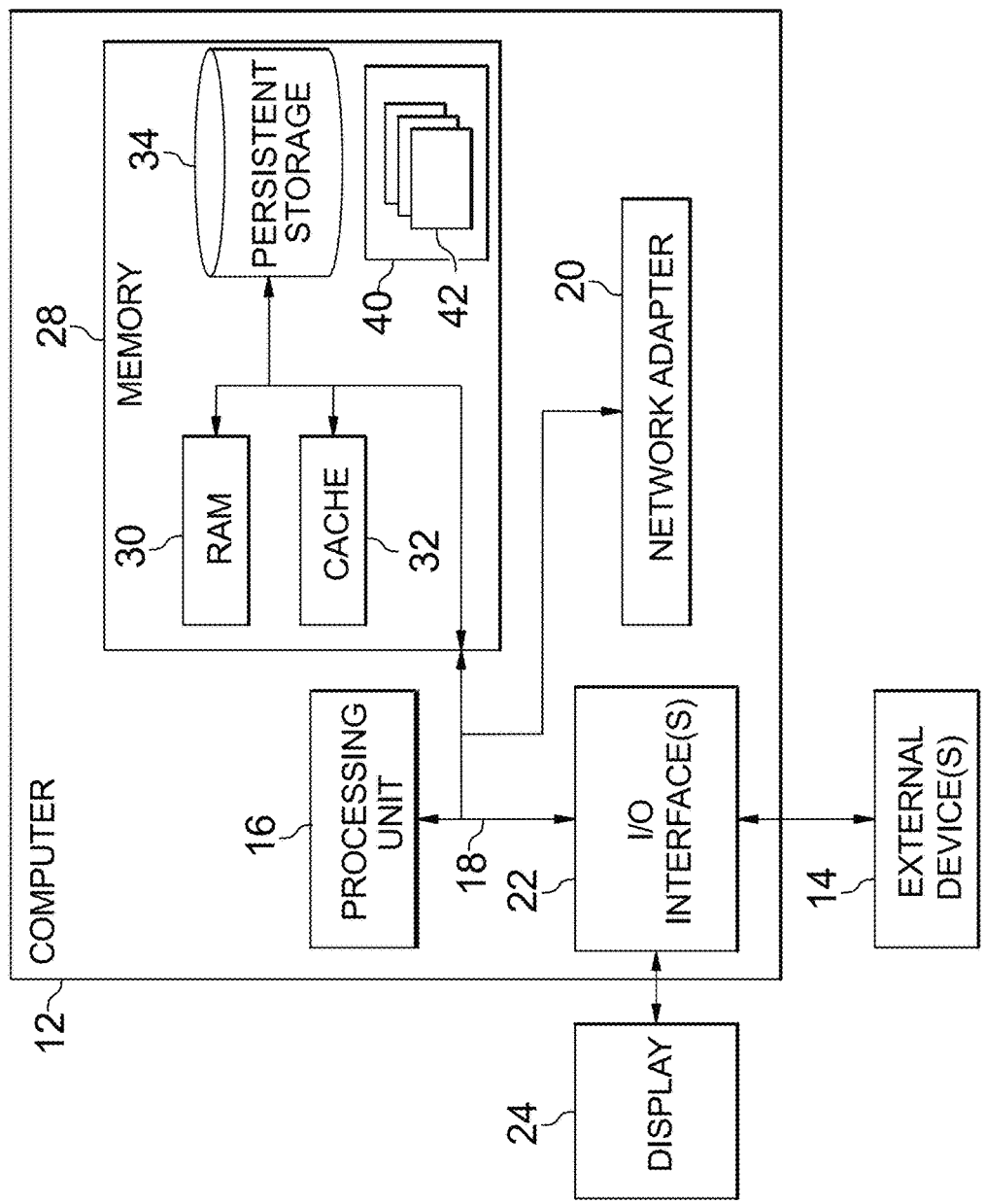
FIG. 3 is a block diagram of additional components of the exemplary computing environment, executing the method for notifying of potentially traffic-impacting events, according to an embodiment of the present invention.

FIG. 3 depicts a block diagram of computer components 10, including components that may be included in control device 110, situation assessment component 112, and/or notification generation component 114 (see FIG. 1), for example, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 12 includes communications fabric 18, which provides communications between memory 28 (including cache 32, random access memory (RAM) 30, and persistent storage 34), processing unit 16, network adapter 20, and input/output (I/O) interface(s) 22. Communications fabric 18 can be implemented with any architecture designed for passing data and/or control information between processors (such as microprocessors, communications and network processors, etc.), system memory, peripheral devices, and any other hardware components within a system. For example, communications fabric 18 can be implemented with one or more buses or a crossbar switch.

RAM 30 and persistent storage 34 are computer readable storage media. In general, RAM 30 can include any suitable volatile or non-volatile computer readable storage media. Cache 32 is a fast memory that enhances the performance of computer processor(s) in processing unit 16 by holding recently accessed data, and data near accessed data, from RAM 30.

Computer program 40, which includes software module(s) 42, may be stored in persistent storage 34 and in RAM 30 for execution by one or more of the respective computer processor(s) of processing unit 16 via cache 32. In an embodiment, persistent storage 34 includes a magnetic hard disk drive. Alternatively, or in addition to a magnetic hard disk drive, persistent storage 34 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 34 may also be removable. For example, a removable hard drive may be used for persistent storage 34. Other examples include optical and magnetic disks, thumb drives, and smart cards that are inserted into a drive for transfer onto another computer readable storage medium that is also part of persistent storage 34.

Network adapter 20, in these examples, provides for communications with other data processing systems or devices. In these examples, network adapter 20 includes one or more network interface cards. Network adapter 20 may provide communications through the use of either or both physical and wireless communications links. Program 40 may be downloaded to persistent storage 34 through network adapter 20.

I/O interface(s) 22 allows for input and output of data with other devices that may be connected to computer 12. For example, I/O interface(s) 22 may provide a connection to external device(s) 14, such as a keyboard, a keypad, a touch screen, and/or some other suitable input device. External devices 14 can also include portable computer readable storage media such as, for example, thumb drives, portable optical or magnetic disks, and memory cards. Software and data used to practice embodiments of the present invention, for example, program 40, can be stored on such portable computer readable storage media and can be loaded onto persistent storage 34 via I/O interface(s) 22. I/O interface(s) 22 also connect to a display 24.

Display 24 provides a mechanism to display data to a user and may be, for example, a computer monitor.

Some embodiments of the present invention include a method for warning of a predefined event potentially impacting vehicle traffic, the method being performed by a control device installed with a vehicle, the vehicle further comprising a printer, the printer being communicatively coupled to the control device and being adapted for printing, in response to receiving a print command from the control device, a patterned layer of a coloring substance to a surface supporting the vehicle, the method comprising, by the control device: obtaining a situation assessment information; in case the situation assessment information is indicative of the event potentially impacting vehicle traffic, causing the printer to print the coloring substance to the surface in a pattern encoding a warning.

In some embodiments, the pattern is independent of the situation assessment information. In some embodiments, the pattern depends on the situation assessment information. In some embodiments, the method further comprises, in case the situation assessment information is indicative of the event, prior to causing the printing: selecting the pattern based on the situation assessment information; and/or in case the situation assessment information further comprises a display information to be displayed to a person and associated with the event, incorporating the display information into the warning.

In some embodiments, the method further comprises determining a criticality metric based on the situation assessment information, wherein the warning is printed only if the criticality metric exceeds a predefined criticality threshold. In some embodiments, the control device determines the criticality metric by providing the situation assessment information to an input of a trained machine-learning model and receiving, in response to the providing, the criticality metric from an output of the trained machine-learning model.

In some embodiments, the method further comprises obtaining a road information characterizing a road currently used by the vehicle, wherein one or more of a dimension of the pattern and a composition of the coloring substance is determined based on the road information; and/or wherein the pattern is printed only if a road type comprised by the situation assessment information and associated with the event matches the road information.

In some embodiments, the method further comprises obtaining an event location associated with the event, the situation assessment information comprising a suggested route to be followed by the vehicle, the pattern being printed only if the route approaches the event location within a predefined maximum event distance.

In some embodiments, the method further comprises, in case the event is an imminent breakdown of the vehicle or an emergency of an occupant of the vehicle, determining a remaining distance the vehicle is expected to cover before stopping due to the event, wherein the printing of the warning is delayed until the remaining distance is less than or equal to a predetermined maximum remaining distance.

In some embodiments, the dimension of the pattern is determined based on a current velocity of the vehicle; and/or wherein the pattern is printed only if one or more of the following criteria are fulfilled: the current velocity exceeds a predefined minimum velocity; the event is expected to occur within a predefined maximum spatial distance from a current location of the vehicle; and the event is expected to occur within a predefined maximum temporal distance from a current system time of the vehicle.

In some embodiments, a color saturation and/or a reflectivity of the coloring substance is configured to fade at a respectively preset desaturation rate under predefined environmental conditions. In some embodiments, the printer is adapted for producing the coloring substance by mixing multiple coloring substance components, the mixture being determined to provide the coloring substance with a desired color characteristic (or color characteristics) comprising one or more of a hue of the color substance, a color saturation, a reflectivity, a desaturation rate of the color saturation, and a desaturation rate of the reflectivity, the method further comprising determining the desired color characteristic based on one or more of a current weather condition, a condition of the surface supporting the vehicle, a road type currently used by the vehicle, a current time of day, and a current environmental light intensity.

In some embodiments, the method further comprises broadcasting a placement message to further traffic participants, the placement message indicating a location where the warning was printed, the placement message optionally further indicating a time when the warning was printed.

In some embodiments, the method further comprises, in case the situation assessment information comprises a signature of an information source of the situation assessment information, validating the signature, the pattern being printed only if the signature is valid.

In some embodiments, the event relates to one or more of an accident, a breakdown, a public event, an expected weather condition, an environmental condition, a traffic condition, a condition of the vehicle, and a condition of an occupant of the vehicle. In some embodiments, the situation assessment information is obtained from one or more of a sensor and/or a processor on board of the vehicle; an internal communication device of the vehicle; the vehicular communication system; and a public communications infrastructure. In some embodiments, the situation assessment information comprises one or more of an identifier, a probability, a location and/or a time associated with the event, a hazard warning, a suggested route to be followed by the vehicle, traffic density data, a weather forecast, data measured by a sensor on board of the vehicle, a vehicle status dataset, and a list of locations potentially affected by the event.

Some embodiments of the present invention include a system for warning of a predefined event potentially impacting vehicle traffic, the system comprising a control device and a printer, the printer being communicatively coupled to the control device and being adapted for printing, in response to receiving a print command from the control device, a patterned layer of a coloring substance, the control device being adapted for obtaining a situation assessment information and, in case the situation assessment information is indicative of the event potentially impacting vehicle traffic, causing the printer to print the coloring substance in a pattern encoding a warning.

Some embodiments of the present invention include a vehicle having installed therein a control device and a printer, the printer being communicatively coupled to the control device and being adapted for printing, in response to receiving a print command from the control device, a patterned layer of a coloring substance to a surface supporting the vehicle, the control device being adapted for obtaining a situation assessment information and, in case the situation assessment information is indicative of a predefined event potentially impacting vehicle traffic, causing the printer to print the coloring substance to the surface in a pattern encoding a warning.

Some embodiments of the present invention include a computer program product for warning of a predefined event potentially impacting vehicle traffic, the computer program product comprising a computer-readable storage medium having program instructions embodied therewith, the program instructions being executable by a control device communicatively coupled to a printer to cause the control device to perform a method comprising: obtaining a situation assessment information; in case the situation assessment information is indicative of the event potentially impacting vehicle traffic, causing the printer to print a coloring substance in a pattern encoding a warning.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Driver: includes, but is not necessarily limited to, the following: (i) a single individual human driver; (ii) an artificial intelligence entity with sufficient intelligence to act as a driver; and/or (iii) a group of multiple drivers.

What is claimed is:

1. A computer-implemented method comprising:
   receiving, by a control device installed with a vehicle, situation assessment information pertaining to vehicle traffic;
   determining, by the control device, whether the situation assessment information is indicative of an event likely to impact the vehicle traffic; and
   in response to determining that the situation assessment information is indicative of the event likely to impact vehicle traffic, sending, by the control device, a print command to a printer communicatively coupled to the control device, the printer adapted to print a patterned layer of a coloring substance to a surface supporting the vehicle, and the print command instructing the printer to print the coloring substance to the surface in a pattern encoding a notification.

2. The computer-implemented method of claim 1, wherein the pattern is independent of the situation assessment information.

3. The computer-implemented method of claim 1, wherein the pattern is based, at least in part, on the situation assessment information.

4. The computer-implemented method of claim 3, wherein the situation assessment information includes display information associated with the event, and wherein the method further comprises incorporating, by the control device, the display information into the notification.

5. The computer-implemented method of claim 1, further comprising:
   determining, by the control device, a criticality metric based, at least in part on the assessment information,
   wherein the sending of the print command to the printer is performed further in response to determining that the criticality metric exceeds a predefined criticality threshold.

6. The computer-implemented method of claim 5, wherein determining the criticality metric includes:
   providing, by the control device, the situation assessment information to an input portion of a trained machine-learning model; and
   receiving, by the control device, the criticality metric from an output portion of the trained machine-learning model.

7. The computer-implemented method of claim 1, further comprising:
   receiving, by the control device, road information characterizing a road currently used by the vehicle,
   wherein:
      a dimension of the pattern and a composition of the coloring substance are determined based, at least in part, on the road information, and
      the sending of the print command to the printer is performed further in response to determining that a road type associated with the event and identified in the situation assessment information matches the road information.

8. The computer-implemented method of claim 1, further comprising:
   receiving, by the control device, an event location associated with the event,
   wherein:
      the situation assessment information identifies a suggested route to be followed by the vehicle, and
      the sending of the print command to the printer is performed further in response to determining that the suggested route approaches the event location within a predefined maximum event distance.

9. The computer-implemented method of claim 1, further comprising:
   in response to determining that the event is an imminent breakdown of the vehicle or an emergency of an occupant of the vehicle, determining, by the control device, a remaining distance the vehicle is expected to cover before stopping due to the event,
   wherein the sending of the print command to the printer is delayed until the remaining distance is less than or equal to a predetermined maximum remaining distance.

10. The computer-implemented method of claim 1, further comprising:
    determining, by the control device, a dimension of the pattern based, at least in part, on a current velocity of the vehicle,
    wherein the sending of the print command to the printer is performed further in response to determining whether any of the following criteria are fulfilled:
       the current velocity exceeds a predefined minimum velocity,
       the event is expected to occur within a predefined maximum spatial distance from a current location of the vehicle, and the event is expected to occur within a predefined maximum temporal distance from a current system time of the vehicle.

11. The computer-implemented method of claim 1, wherein a color saturation and a reflectivity of the coloring substance are configured to fade at respective preset desaturation rates under predefined environmental conditions.

12. The computer-implemented method of claim 1, wherein:
the printer is adapted to produce the coloring substance by mixing multiple coloring substance components, and
the mixing is determined to provide the coloring substance with one or more desired color characteristics selected from the group consisting of: a hue, a color saturation, a reflectivity, a desaturation rate of the color saturation, and a desaturation rate of the reflectivity, and wherein the method further comprises.

13. The computer-implemented method of claim 12, further comprising:
determining, by the control device, the one or more desired color characteristics based, at least in part, on one or more items selected from the group consisting of: a current weather condition, a condition of the surface supporting the vehicle, a road type currently used by the vehicle, a current time of day, and a current environmental light intensity.

14. The computer-implemented method of claim 1, further comprising:
broadcasting, by the control device, a placement message to other traffic participants,
wherein:
the placement message indicates a location where the notification was printed, and
the placement message indicates a time when the notification was printed.

15. The computer-implemented method of claim 1, wherein the sending of the print command to the printer is performed further in response to validating a signature of an information source of the situation assessment information.

16. The computer-implemented method of claim 1, wherein the event relates to one of more items selected from the group consisting of:
an accident,
a breakdown,
a public event,
an expected weather condition,
an environmental condition,
a traffic condition,
a condition of the vehicle, and
a condition of an occupant of the vehicle.

17. The computer-implemented method of claim 1, wherein the situation assessment information is received from a source selected from the group consisting of:
a sensor on board the vehicle,
a processor on board the vehicle,
an internal communication device of the vehicle,
a vehicular communication system, and
a public communications infrastructure.

18. The computer-implemented method of claim 1, wherein the situation assessment information includes one or more items selected from the group consisting of:
an identifier,
a probability,
a location associated with the event,
a time associated with the event,
a hazard warning,
a suggested route to be followed by the vehicle,
traffic density data,
a weather forecast,
data measured by a sensor on board of the vehicle,
a vehicle status dataset, and
a list of locations potentially affected by the event.

19. A computer program product comprising a computer readable storage medium having stored thereon:
program instructions to receive, by a control device installed with a vehicle, situation assessment information pertaining to vehicle traffic;
program instructions to determine, by the control device, whether the situation assessment information is indicative of an event likely to impact the vehicle traffic; and
program instructions to, in response to determining that the situation assessment information is indicative of the event likely to impact vehicle traffic, send, by the control device, a print command to a printer communicatively coupled to the control device, the printer adapted to print a patterned layer of a coloring substance to a surface supporting the vehicle, and the print command instructing the printer to print the coloring substance to the surface in a pattern encoding a notification.

20. A computer system comprising:
a vehicle having installed therewith a control device and a printer, the printer being communicatively coupled to the control device, and the printer being adapted to print a patterned layer of a coloring substance to a surface supporting the vehicle; and
a computer readable storage medium;
wherein:
the control device is structured, located, connected and/or programmed to run program instructions stored on the computer readable storage medium; and
the program instructions include:
program instructions to receive situation assessment information pertaining to vehicle traffic;
program instructions to determine whether the situation assessment information is indicative of an event likely to impact the vehicle traffic; and
program instructions to, in response to determining that the situation assessment information is indicative of the event likely to impact vehicle traffic, send a print command to the printer, the print command instructing the printer to print the coloring substance to the surface in a pattern encoding a notification.

* * * * *